United States Patent [19]
Kajitani

[11] Patent Number: 6,163,438
[45] Date of Patent: Dec. 19, 2000

[54] SUPPORTING MECHANISM OF A MAGNETIC HEAD SLIDER EMPLOYING A LUBRICANT BETWEEN THE SURFACES OF THE SLIDER AND PORTIONS OF THE MOUNTING GIMBAL

[75] Inventor: Hiroshi Kajitani, Tokyo, Japan

[73] Assignee: NEC Corporation, Tokyo, Japan

[21] Appl. No.: 09/234,467

[22] Filed: Jan. 21, 1999

[30] Foreign Application Priority Data

Jan. 22, 1998 [JP] Japan .................................. 10-010714

[51] Int. Cl.[7] ....................................................... G11B 5/48
[52] U.S. Cl. ..................................... 360/245.7; 360/246.4
[58] Field of Search ................................. 360/245–245.7, 360/246.1–246.5

[56] References Cited

U.S. PATENT DOCUMENTS 5,898,541  4/1999  Boutaghou .............................. 360/109

OTHER PUBLICATIONS

Harold Hamilton, "Contact Recording on Perpendicular Rigid Media", Journal of the Magnetics Society of Japan, vol. 15 Supplement, No. S2 (1991), pp. 483–490.

*Primary Examiner*—A. J. Heinz
*Attorney, Agent, or Firm*—McGinn & Gibb, P.C.

[57] ABSTRACT

To provide a supporting mechanism of a contact-type magnetic head slider (1) which enables high-speed and precise positioning as well as excellent follow-up performance to a magnetic disk (D) of the magnetic head slider (1), the supporting mechanism (10) comprises a beam suspension (20) rotating in a direction perpendicular to recording tracks of the magnetic disk (D) for positioning the magnetic head slider (1) and impressing a load onto the magnetic head slider (1) towards the recording surface, a gimbal (30) for connecting the magnetic head slider (1) to the beam suspension (20) in a manner enabling the magnetic head slider (1) to swing in a rolling and a pitching direction, close-set members (41) each extending from a base frame (32) of the gimbal (30) to face one of side surfaces of the magnetic head slider (1), and lubricant (42) retained between each of the close-set members (41) and corresponding one of the side surfaces.

17 Claims, 10 Drawing Sheets

SUPPORTING MECHANISM OF A MAGNETIC HEAD SLIDER EMPLOYING A LUBRICANT BETWEEN THE SURFACES OF THE SLIDER AND PORTIONS OF THE MOUNTING GIMBAL

BACKGROUND OF THE INVENTION

The present invention relates to a supporting mechanism of a magnetic head slider and a magnetic disk device equipped with the same, and more particularly relates to a supporting mechanism of a slider mounted with a magnetic head which performs contact reading/writing of a magnetic disk and a magnetic disk device equipped with the supporting mechanism.

For improving recording density of the magnetic disk device, reduction of the magnetic spacing., that is, the distance between a top of a magnetic gap of the magnetic head and a surface of the recording layer of the magnetic disk has been pursued earnestly together with improvement of magnetic characteristics of the magnetic head and the magnetic disk.

As to a read/write system having a conventional flying type magnetic head wherein the magnetic spacing is defined by thickness of a protection film for protecting the slider surface facing the air bearing, thickness of a protection film and/or a lubrication film of the magnetic disk surface, roughness of the magnetic disk surface, and so on, the magnetic spacing of about 40 to 50 nm is attained now.

However, the magnetic spacing is considered to be less than 15 nm for realizing recording density of 10 to 20 G bits/inch$^2$ or more.

For enabling such small magnetic spacing, contact-type magnetic disk devices, which have a magnetic head operating in continuous sliding contact with recording media, have been developed, wherein magnetic information is recorded and reproduced by a magnetic head mounted on a head slider sliding on a surface of a magnetic disk continuously contacting with the disk surface. An example thereof is introduced in "Contact Recording on Perpendicular Rigid Media" by H. Hamilton, the Journal of Magnetic Society of Japan, vol. 15, Supplement No. S2 (1991), pp. 483–490.

FIG. 8 is a schematic diagram illustrating a basic configuration of the contact-type magnetic disk device.

The contact-type magnetic disk device of FIG. 8 comprises a contact-type magnetic head 107 for reading/writing information on a magnetic disk D, a head slider 101 whereon the contact-type magnetic head 107 is mounted, and a beam suspension 106 for supporting the head slider 101 having contact pads 108 and 109 to be pushed onto the magnetic disk D.

The beam suspension 106 is fixed to a positioning actuator 102, which takes charge of positioning the contact-type magnetic head 107 on a desired track of the magnetic disk D, by way of a positioning actuator arm 112. The beam suspension 106 is made of a leaf spring and pushes the head slider 101 onto the magnetic disk D with its flexural rigidity.

FIGS. 9A to 9C are perspective views illustrating details of the head slider 101 and the beam suspension 106 of FIG. 8. As shown in FIG. 9A, the head slider 101 is set at a top part of the beam suspension 106 whereon electric wirings 113 are printed directly. FIG. 9B illustrates an enlargement of the head slider 101 wherein the magnetic head 107 is configured, and FIG. 9C illustrates an enlargement of a half cut of the contact pad 108, which is provided on an undersurface of the head slider 101 so that the magnetic head 107 can perform contact reading or writing by way of a yoke 111 penetrating through the contact pad 108.

In the above basic example, the beam suspension 106 is made of a simple leaf spring. However, in many cases, a secondary suspension such as a gimbal is further provided for improving follow-up performance of the head slider to the disk surface. An example thereof is illustrated in FIG. 10, wherein the same or the corresponding parts with the magnetic disk device of FIG. 8 are denoted by the same numerals and the duplicated descriptions are omitted.

In the conventional example of FIG. 10, the head slider 101 is supported by a gimbal 121 which is fixed to the beam suspenision 106, and the head slider 101 is pushed to the magnetic disk D by the beam suspension 106 through the gimbal 121.

In a still another example disclosed in a Japanese patent application laid open as a Provisional Publication No. 250793/'93, the magnetic head is supported by the head slider by way of minute springs which act as secondary springs for improving the follow-up performance of the magnetic head in a high frequency range.

The supporting mechanism of the head slider is required to have sufficiently high rigidity in a radial direction of recording tracks of the magnetic disk (rotating direction of the beam suspension), for realizing sufficiently high-speed and precise seeking movement on the disk surface, and to have sufficiently strength in a tangential direction of the recording tracks, against frictional and viscous resistance of lubricant applied between the head slider and the disk surface.

On the other hand, the supporting mechanism is required as well to have certain flexibility or compliance for allowing rolling (rotating around an axis in the tangential direction of the recording tracks) and pitching (rotating around an axis in the radial direction of the recording tracks) movement of the head slider so that the head slider can follow the disk surface adequately. The flexibility of the supporting mechanism pertains also deeply to setting margins for assembling the magnetic disk device. The larger the flexibility is, the larger setting margins are obtained.

Furthermore, the load of the suspension to push the contact slider towards the disk surface should be considerably small in the contact-type magnetic disk device, compared to ordinary flying-type magnetic head system, for reducing frictional and viscous resistance and wearing of the head slider.

However, the small load and the high rigidity of the suspension in the pitching and the rolling direction of the head slider makes unstable the posture of the head slider, and the continuous sliding contact between the pad surface and the disk surface can not be maintained when there is provided but one contact pad, or, even when more than one contact pads are provided, the unstable posture produces unequal pad pressures and jumping of a specific pad, resulting in degradation of recording/reproducing characteristics of the magnetic head.

Therefore, the rigidity of the suspension in the pitching and the rolling direction of the head slider should be also designed to be small in proportion to the pushing load.

As above described, two conflicting requirements, rigidity and flexibility are imposed onto the supporting mechanism of the contact-type head slider.

When priority is given to the flexibility, sufficient rigidity of the suspenision in its rotating direction for suppressing at vibration mode of the suspension in the accessing direction cannot be obtained and rigidity against a primary or a secondary vibration mode of the suspension system becomes low, resulting in increase of vibration amplitude as well as at fall of resonance frequency of each vibration mode.

The vibration of the head slider or the suspension system, whereof frequency ranges are out of controllable frequency band, produces off-track of the magnetic head from the data tracks recorded on the magnetic disk. Therefore, the recording/reproducing operation of the magnetic head is forced to wait for attenuation of these vibration modes which are excited by every accessing movement. Furthermore, even in the track following movement, the off-track may be caused by vibration being stimulated by external noises other than the accessing movement.

These problems have been an obstacle to the high-speed and the high-density recording/reproduction.

On the other hand, when the gimbal rigidity is made comparatively high to the contacting rigidity between the head slider and the magnetic disk, (namely, the film tension when there is provided a lubrication film, or the pushing, force of the suspension when there is no lubrication film,) assembling tolerances become severe and pressure of each contact pad becomes easy to vary. Therefore, the contact sliding between the head slider and the disk surface becomes unstable because of degradation of the the follow-up performance of the head slider to the disk surface, which not only accelerates wearing of the head slider and the magnetic disk, but also makes high the error rate through fluctuation of signal intensity caused by jumping of the head slider, resulting in poor HDI (Head-Disk Interface) reliability.

These are the problems included in the conventional supporting mechanism of the magnetic head slider.

SUMMARY OF THE INVENTION

Therefore, a primary object of the present invention is to provide a supporting mechanism of a contact-type magnetic head slider which enables high-speed and precise positioning as well as excellent follow-up performance to the disk surface of the magnetic head slider, and to provide a magnetic disk device equipped with the same, by resolving the above problems.

In order to achieve the object, the supporting mechanism of the invention, which support a magnetic head slider performing recording and reproducing magnetic information of a magnetic disk in continuous sliding contact with a recording surface of the magnetic disk, comprises:

a beam suspension rotating in a direction perpendicular to recording tracks of the magnetic disk for positioning the magnetic head slider provided at an outer end of the beam suspension and impressing a load onto the magnetic head slider towards the recording surface;

a gimbal for connecting the magnetic head slider to the beam suspension in a manner enabling the magnetic head slider to swing in a rolling and a pitching direction;

at least one close-set members, each of the close-set members extending from a base frame of the gimbal to face one of side surfaces of the magnetic head slider, and lubricant retained between each of the close-set members and corresponding one of the side surfaces.

The lubricant shows high rigidity against high frequency tension and compression produced between the close-set members and the side surfaces of the magnetic head slider. Therefore, the high rigidity against high-speed movement, such as seeking movement can be obtained in the supporting mechanism according to the invention, even when the gimbal is designed to have sufficient flexibility to permit supple pitching and rolling movement of the magnetic head slider for improving follow-up performance thereof.

Hence, vibration of the magnetic head slider because of high-speed seeking movement, for example, can be surely suppressed without reducing assembling tolerances and excellent follow-up performance of the magnetic head slider to the magnetic disk, large assembling tolerances and high-speed and high-precision positioning of the magnetic head slider can be realized at the same time.

The close-set, members may be two close-set members each facing either one of two side surfaces of the magnetic head slider perpendicular to a rotating direction of the beam suspension, or may include a close-set member facing one of the side surfaces of the magnetic head slider perpendicular to a rotating direction of the magnetic disk.

A reservoir for retaining the lubricant is preferably provided at a part of each of the close-set members being most close to corresponding one of the side surfaces.

As to the lubricant, the same material used for lubrication between the magnetic head slider and the magnetic disk can be applied to the lubricant retained between the close-set members and the side surfaces of the magnetic head slider, or it may be grease-like material.

Still preferably, there may be provided all elevator for keeping the magnetic head slider separate from a surface of the magnetic disk when the magnetic disk is not rotating.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
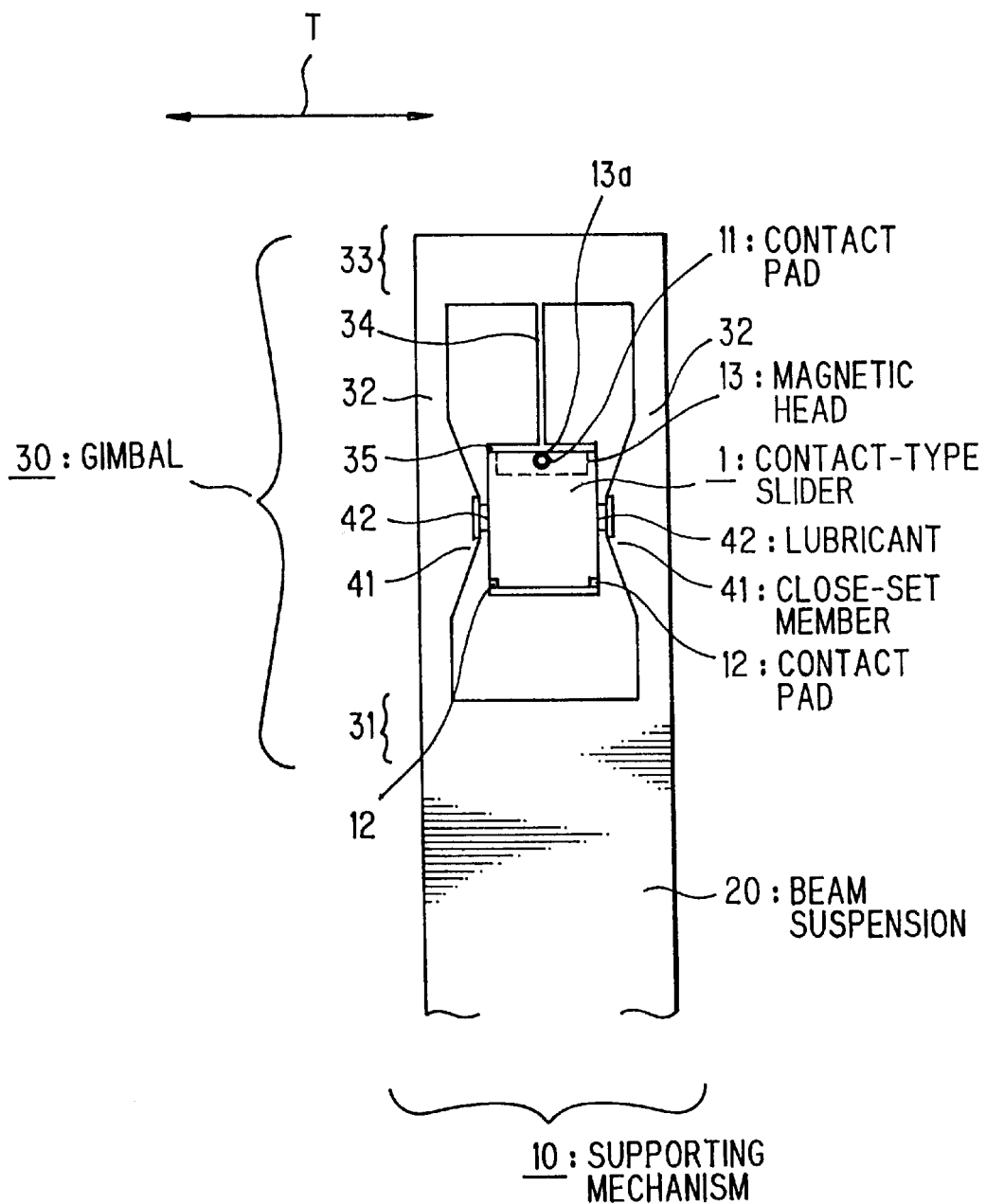
FIG. 1 is a plan view illustrating a top part of a supporting mechanism 10 according to an embodiment of the invention.
Figure 2:
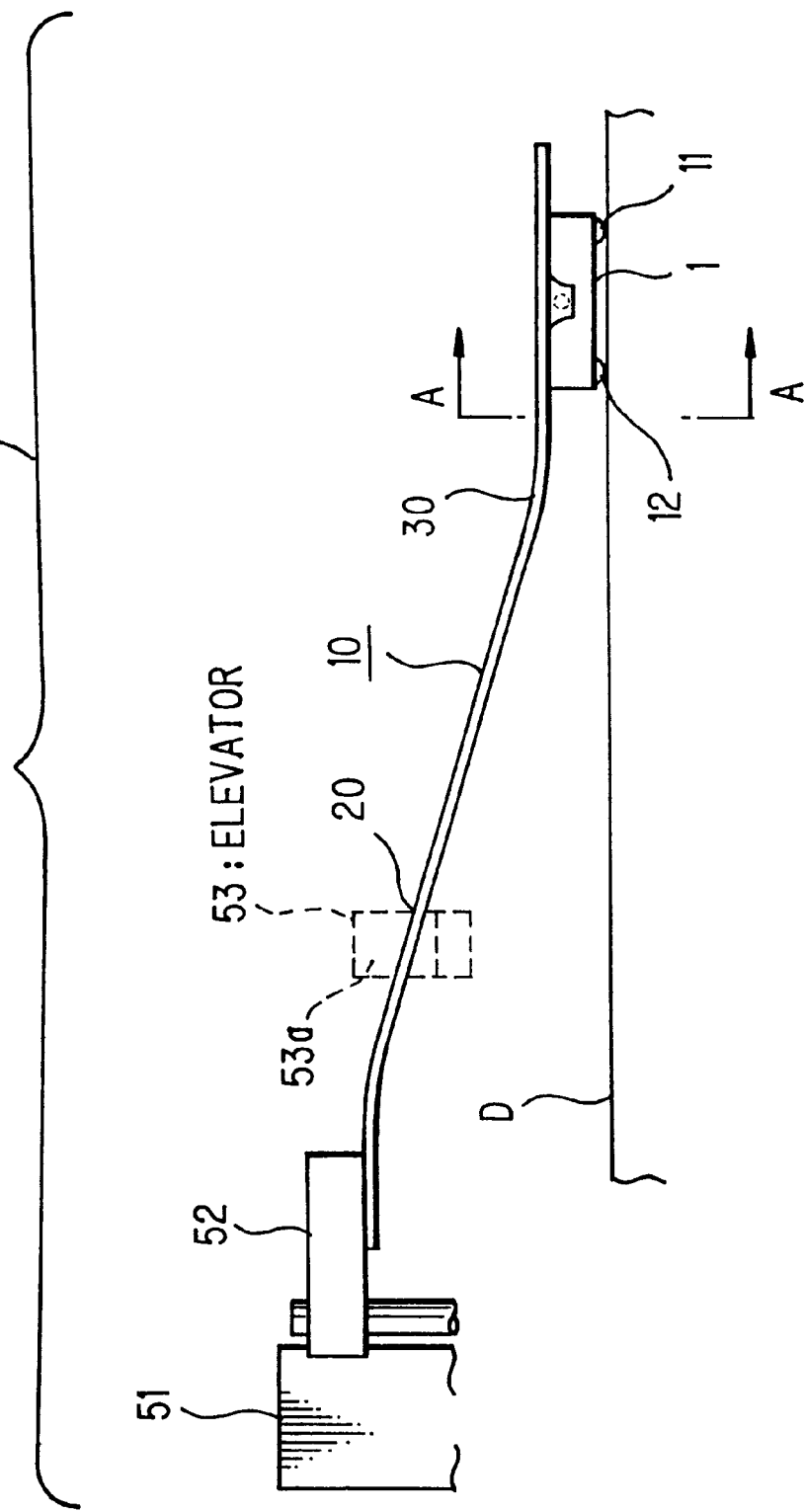
FIG. 2 is a side view illustrating a magnetic disk device 50 equipped with the supporting mechanism 10 of FIG. 1.

FIG. 2 is a side view illustrating a magnetic disk device 50 according to an embodiment of the invention equipped with a slider supporting mechanism 10 for supporting a magnetic head slider 1 operating in sliding contact with a magnetic disk D. FIG. 1 is a plan view illustrating a top part of the supporting mechanism 10 facing to the magnetic disk D (lower side in FIG. 2), and FIG. 3 is a magnified sectional view illustrating a section of the supporting mechanism 10 being cut along a plane A—A of FIG. 2.

Figure 3:
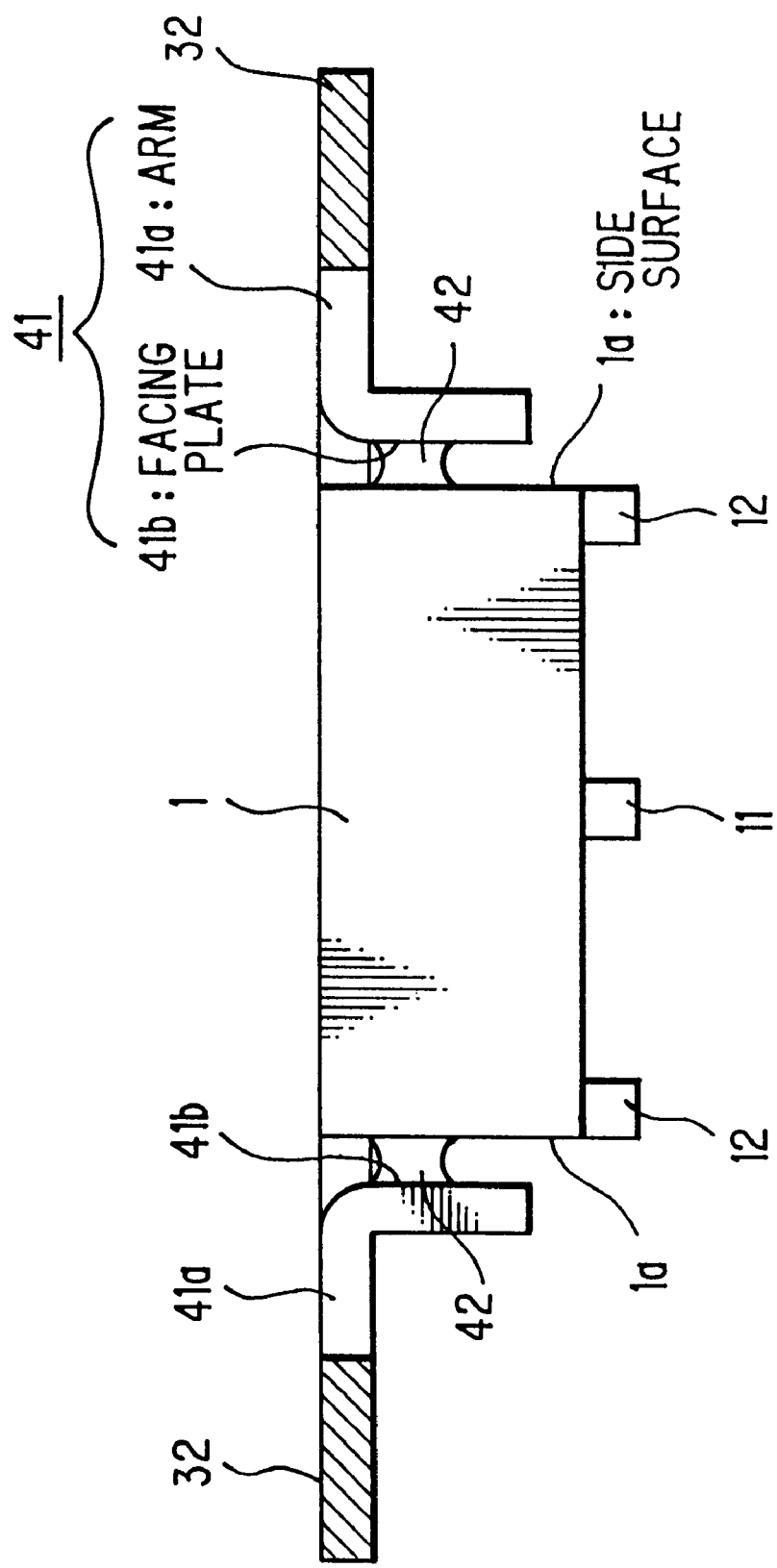
FIG. 3 is a magnified sectional view illustrating a section of the supporting mechanism 10 being cut along a plane A—A of FIG. 2.

Referring to FIGS. 1 to 3, the supporting mechanism 10 of the magnetic disk device 50 supports the magnetic head slider 1 having three contact pads 11, 12 and 12, whereby the magnetic head slider 1 slides in continuous contact with the magnetic disk D, and by way of the contact pad 11, magnetic information of the magnetic disk D is recorded and reproduced.

The supporting mechanism 10 comprises a beam suspension 20 rotating in a direction transversal to recording tracks of the magnetic disk D and impressing a load on the magnetic head slider 1 towards the magnetic disk D, and a plate gimbal 30 provided at an outer end of the beam suspension 20 for supporting the magnetic head slider 1 so that the magnetic head slider 1 may swing easily.

To the gimbal 30 of the embodiment, close-set members 41 are further provided. Each of the close-set members 41 is so configured as to face one of side surfaces 1a of the magnetic head slider 1, and a drop of lubricant 42 is injected between them as shown in FIG. 3.

As shown in FIG. 1, at an end of the magnetic head slider 1, (upper end in FIG. 1) where the contact pad 11 is provided, a magnetic head 13 is configured, in a similar way, with an ordinary flying-type head slider. A magnetic sensor 13a of the magnetic head 13 is extended, penetrating through the contact pad 11, to a bottom surface of the contact pad 11 contacting with the magnetic disk D. The magnetic head slider 1 is connected with an adhesive to a center part of the gimbal 30.

The gimbal 30 is configured in one unit with the beam suspension 20 into a strip form from a leaf spring, as illustrated in FIG. 1. The other end of the beam suspension 20 is fixed to an actuator arm 52 which is rotated by a positioning actuator 51 for positioning the magnetic head slider 1 on a desired track of the magnetic disk D. The beam suspension 20 is bended towards the magnetic disk D and impresses a pushing load towards the magnetic disk D onto the magnetic head slider 1 through the gimbal 30.

The gimbal 30 is positioned at the outer end of the beam suspension 20 and an ending part of the suspension beam 20 composes a gimbal frame base 31 configuring the gimbal 30. From the gimbal base frame 31, two gimbal frame arms 32 are extended in parallel to be coupled with an gimbal frame top 33 at their ends. From the center of the gimbal frame top 33, a gimbal arm 34 is extended towards the gimbal frame base 31 in parallel to the gimbal frame arms 32. At the top of the gimbal arm 34, there is configured a slider connector 35 whereto the magnetic head slider 1 is fixed with the adhesive so as to position between the two gimbal frame arms 32 and between the gimbal base frame 31 and the gimbal top frame 33.

As above described, the gimbal 30 has a rectangular frame consisting of the gimbal base frame 31, the two gimbal frame arms 32 and the gimbal top frame 33, and the slider connector 35 is positioned in the rectangular frame being connected to the gimbal top frame 33 through the gimbal arm 34. Therefore, being fixed to the slider connector 35, the magnetic head slider 1 is easy to swing in its rolling direction through twisting the gimbal arm 34, and in its pitching direction through bending the gimbal arm 34.

Here, in the embodiment of FIGS. 1 to 3, the two close-set members 41 are configured in the middle of both of the two gimbal frame arms 32 so as to face two side surfaces 1a of the magnetic slider 1, respectively.

Members of the gimbal 30, that is, the gimbal base frame 31, the two gimbal frame arms 32, the gimbal top frame 33, the gimbal arm 34, the slider connector 35 and the two close-set members 41 are all configured in one unit together with the beam suspension 20 from a single leaf spring.

Electric wirings (not depicted in the drawings) are printed making use of a thin-film process on the beam suspension 20 and the gimbal 30 along the gimbal arm 34 until the slider connecter 35.

As shown in FIG. 3, each of the close-set members 41 comprises a member arm 41a extending from the gimbal frame arm 32 towards the magnetic head slider 1, and a facing plate 41b extending from the top of the member arm 41a so as to face a side surface 1a (perpendicular to a lower surface facing the magnetic disk D) of the magnetic head slider 1 inserting a small gap.

In the embodiment of FIGS. 1 to 3, the two close-set members 41 are arranged to face the two side surfaces 1a perpendicular to the rotating direction (represented by a seeking direction T in FIG. 1) of the beam suspension 20.

Between each facing plate 41b and the corresponding side surface 1a of the magnetic head slider 1, a drop of lubricant 42 is injected. As to the lubricant 42, lubrication fluid, such as grease-like oil, having appropriate viscosity can be used. Preferably, the same material as used for lubrication between the contact pads 11 and 12 and the magnetic disk D, such as Fomblin Z-DOL (a trademark of MONTEFLUOS Co.), is applied to the lubricant 42.

A numeral 53 of FIG. 2 denotes an elevator of the magnetic disk device 50. The elevator 53, according to so called a ramp-road system, has a slope 53a for contacting to and scooping up the lower surface of the beam suspension 20 to lift the magnetic head slider 1 from the disk surface when the beam suspension 20 is rotated for making the magnetic head slider 1 retreat from the recording surface of the magnetic disk D.

Now, operation of the magnetic disk device 1 is described.

When recording or reproducing of the magnetic information of the magnetic disk D is performed, the suspension beam 20 of the supporting mechanism 10 is rotated and released from the elevator 53, and the magnetic head slider 1, which is positioned on a desired track of the magnetic disk D being impressed with a load by the beam suspension 20, performs the recording or the reproducing in sliding contact with the magnetic disk D.

Here, the load impressed by the beam suspension 20 is transferred to the magnetic head slider 1 through the gimbal 30 of the supporting mechanism 10, and more concretely, through the gimbal arm 34 and viscosity of the lubricant 42. The load transferred through the viscosity of the lubricant 42 is very small against low frequency movement such as loading movement of the magnetic head slider 1 onto the disk surface, or rolling and pitching movement of the magnetic head slider 1 to follow undulation of the disk surface. Therefore, by giving sufficient. flexibility to the gimbal arm 34, excellent follow-up performance of the magnetic head slider 1 to the recording surface of the magnetic disk D can be obtained together with sufficient assembling tolerances of the magnetic disk device 50.

On the other hand, the lubricant 42, retained with its meniscus effect between the facing plates 41b of the close-set members 41 and the side surfaces 1a of the magnetic head slider 1, shows certainly high rigidity against tension and compression produced between the facing plates 41b and the side surfaces 1a, and has a high damping effect to high-frequency movement. Therefore, the lubricant 42 gives necessary rigidity for suppressing inertia of the magnetic head slider 1 caused by seeking movement and sufficient strength against frictional and viscous resistance of lubricant, applied between the magnetic head slider 1 and the recording surface of magnetic disk D.

This rigidity can be easily controlled by selecting density, a volume or a size of contacting areas, or a material constant of the lubricant 42.

Furthermore, with the high damping effect of the lubricant, 42, the vibration amplitude in the off-track direction of the magnetic head slider 1 can be surely restricted and the vibration frequency can be heightened into controllable frequency band by the rigidity of the lubricant 42, enabling to reduce off-track margins. Therefore, the track separations of the magnetic disk D can be made still narrower, and higher recording density than the conventional magnetic disk device can be realized in the magnetic disk device 50.

Still further, in the magnetic disk device 50 according to the embodiment, the magnetic head slider 1 retreats from the recording surface of the magnetic disk D when the recording or the reproducing is finished. When the beam suspension 20 is rotated for shifting the magnetic head slider 1 out of the recording surface, lower surface of the suspension beam 20 contacts to the slope 53a of the elevator 53 and lifts the magnetic head slider 1 from the magnetic disk D being guided and scooped up along the slope 53a.

Therefore, the magnetic head slider 1 is kept separate from the magnetic disk D whenever the magnetic disk D is not rotating, and hence, the problem of absorption between the magnetic head slider and the magnetic disk can be prevented. When the problem of the absorption is prevented, smoothness of the recording surface of the magnetic disk D can be easily maintained in good status, and freedom for selecting lubrication material to be applied to the disk surface becomes wide. Therefore, at magnetic disk device more stable and having higher recording density can be provided.

Figure 4:
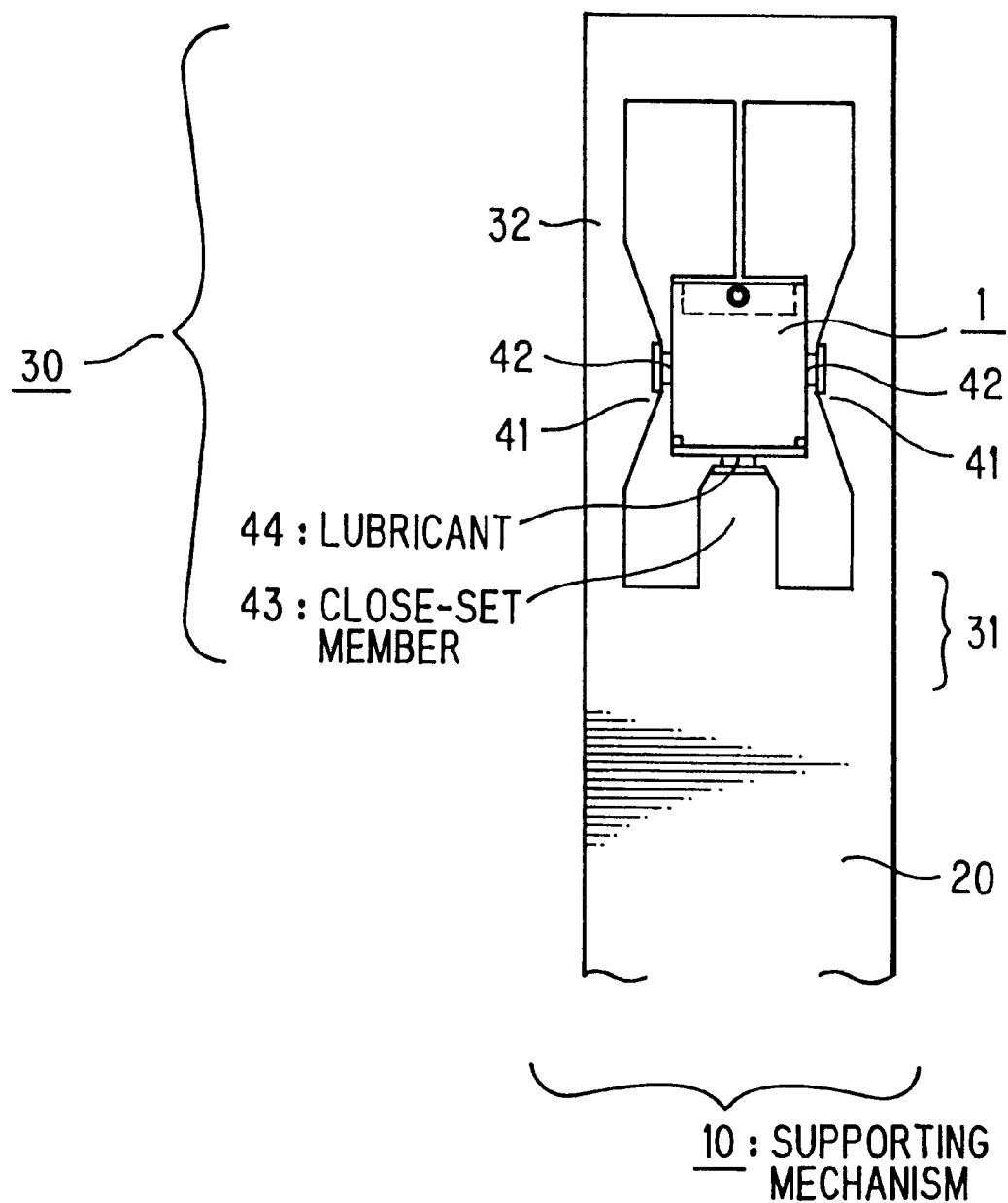
FIG. 4 is a plan view illustrating a top part of another supporting mechanism 10 having a third close-set member 43.
Figure 5:
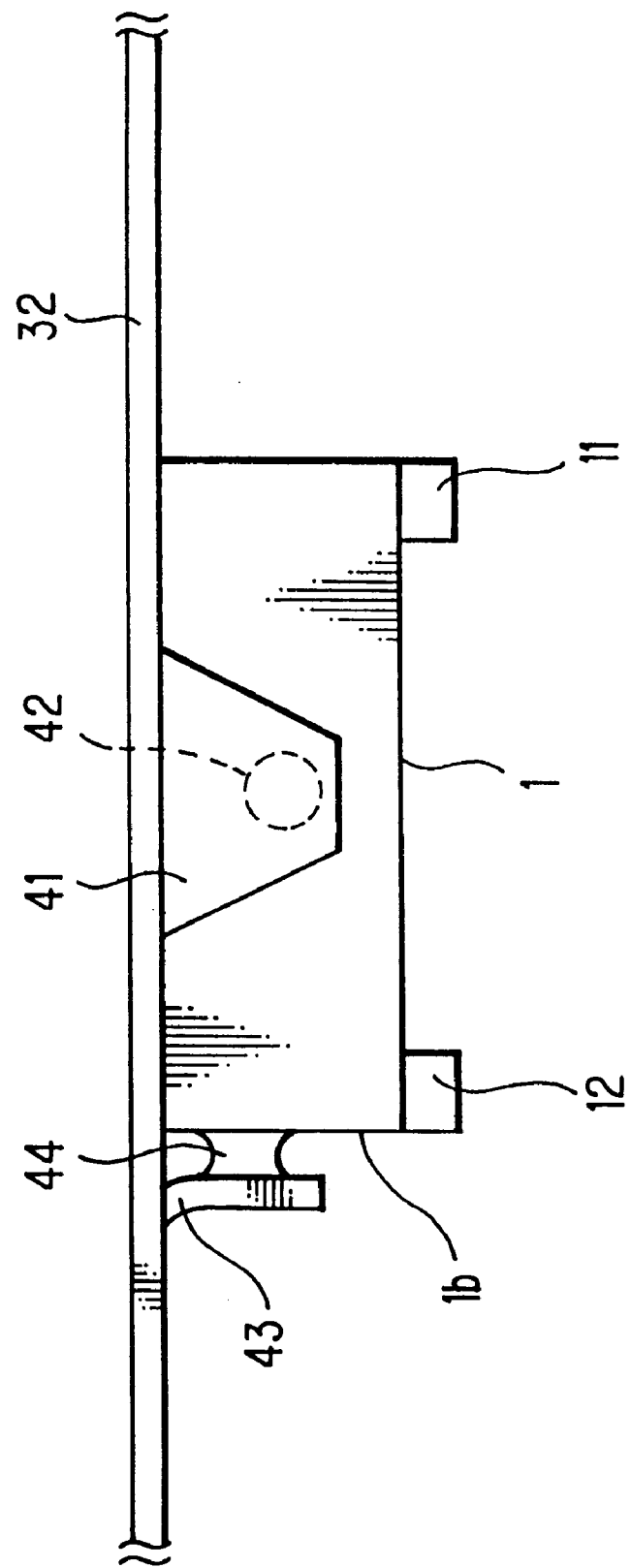
FIG. 5 is a magnified side view illustrating the top part of the supporting mechanism 10 of FIG. 4.

In the embodiment of FIGS. 1 to 3, two close-set members 41 are provided to face two side surfaces 1a both perpendicular to the off-track direction (in parallel with the track direction). However, it is more preferable to provide another close-set member 43 facing) a side surface 1b perpendicular to the track direction, as shown in FIGS. 4 and 5.

The close-set member 43 consists of a member arm extending from the gimbal base frame 31 towards a side surface 1b of the magnetic head slider 1 which is opposite to a side surface fixed to the slider connecter 35, and a facing plate provided at a top of the member arm so as to be positioned adjacent in parallel to the side surface 1b.

Between the facing plate and the side surface 1b, a drop of lubricant 44 is injected in the same way with the two close-set members 41.

By providing the close-set member 43 and the lubricant 44, jitter-suppressing performance, which is important for the contact-type magnetic head slider, can be improved by heightening rigidity of the magnetic head slider 1 in the rotating direction of the magnetic disk D.

Figure 6:
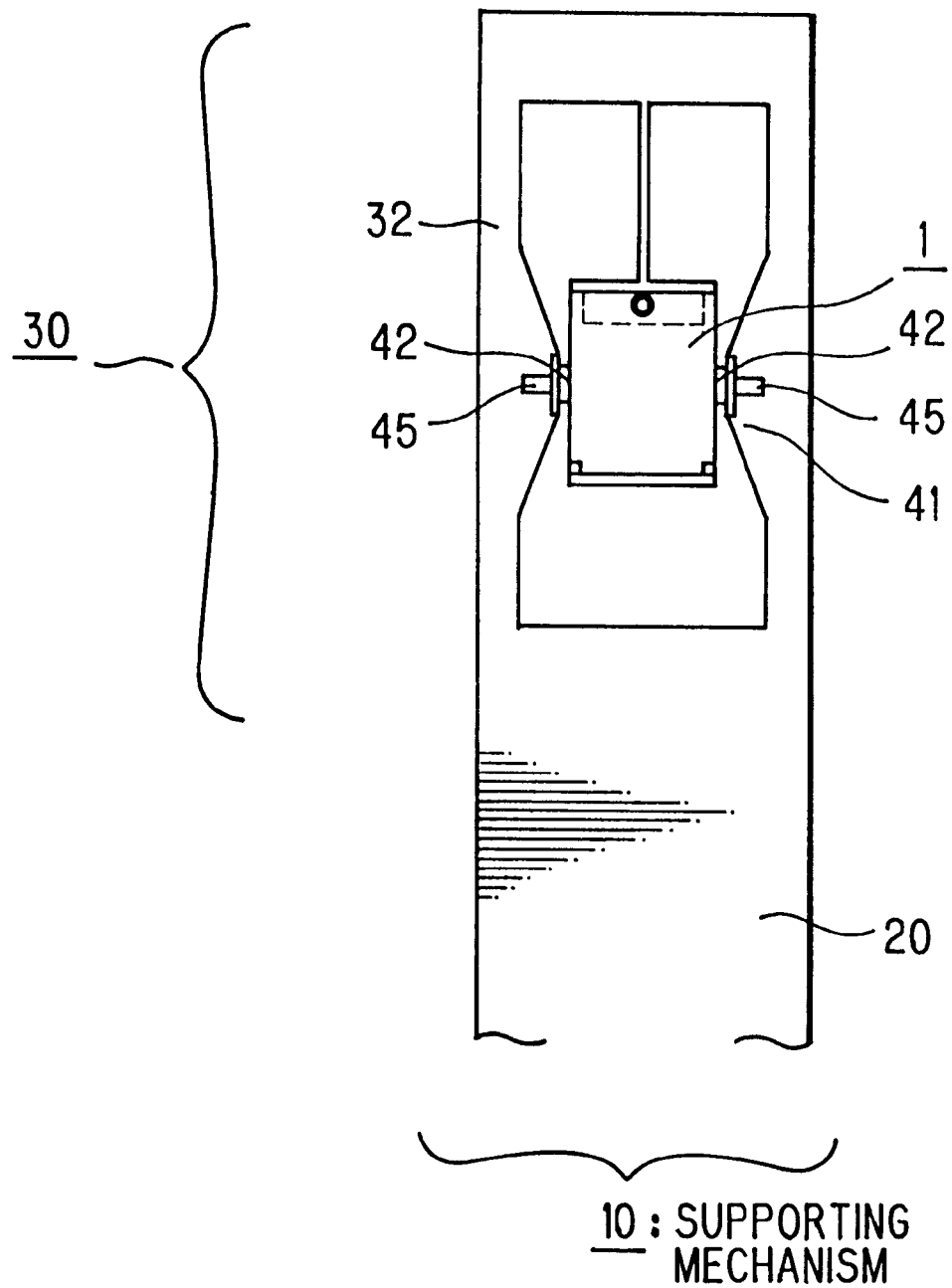
FIG. 6 is a plan view illustrating a top part of a still another supporting mechanism 10 heaving a reservoir 45 for each of the close-set members.
Figure 7:
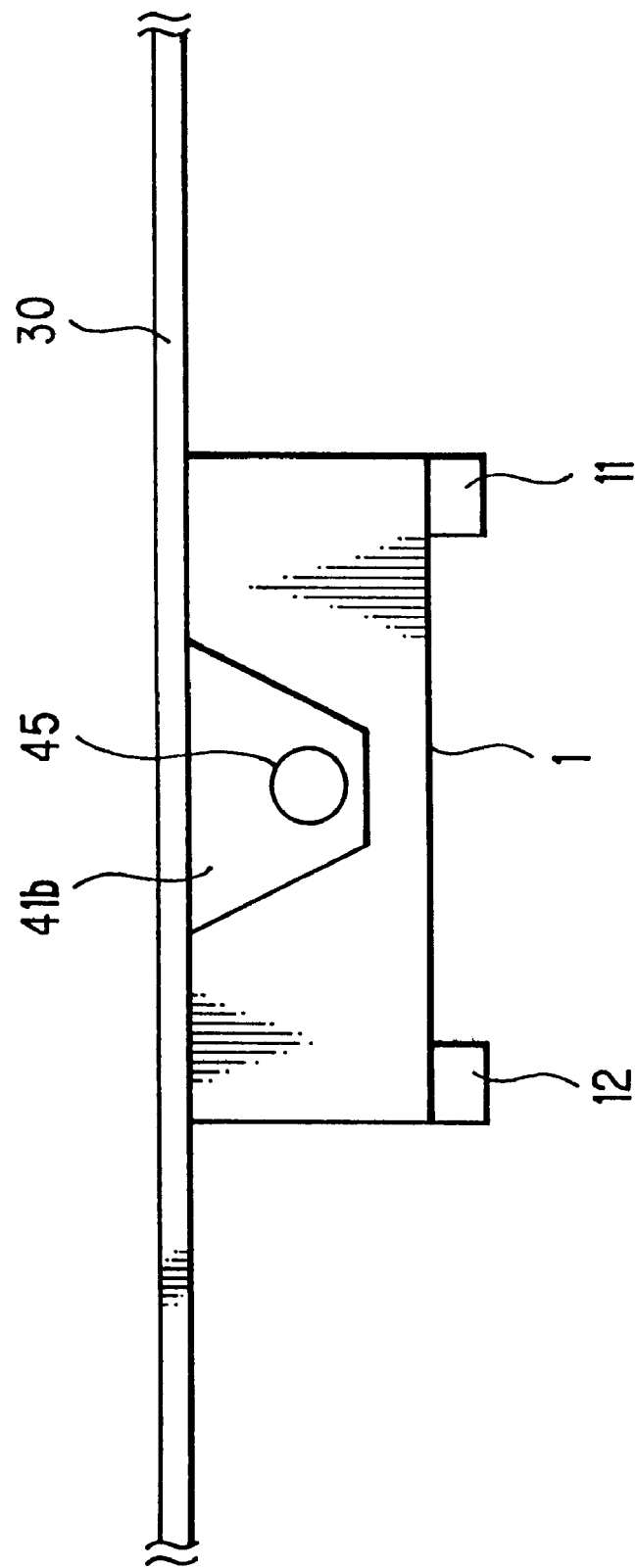
FIG. 7 is a magnified side view illustrating the top part of the supporting mechanism 10 of FIG. 6.
Figure 8:
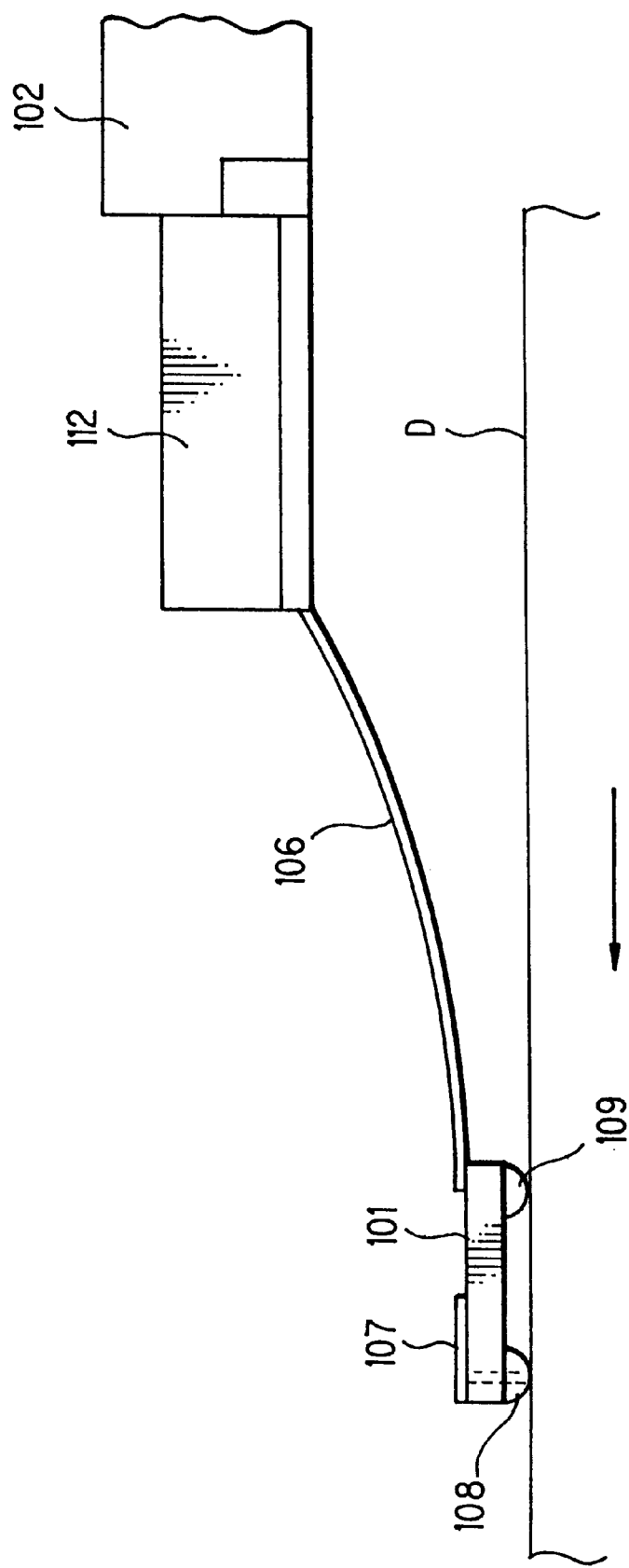
FIG. 8 is a schematic diagram illustrating a basic configuration of a conventional contact-type magnetic disk device.
Figure 9A:
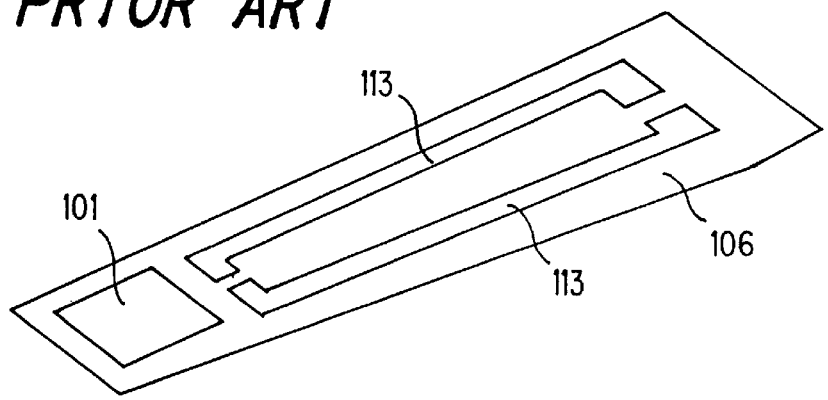
FIG. 9A is a perspective view of a suspension beam 106 of FIG. 8.
Figure 9B:
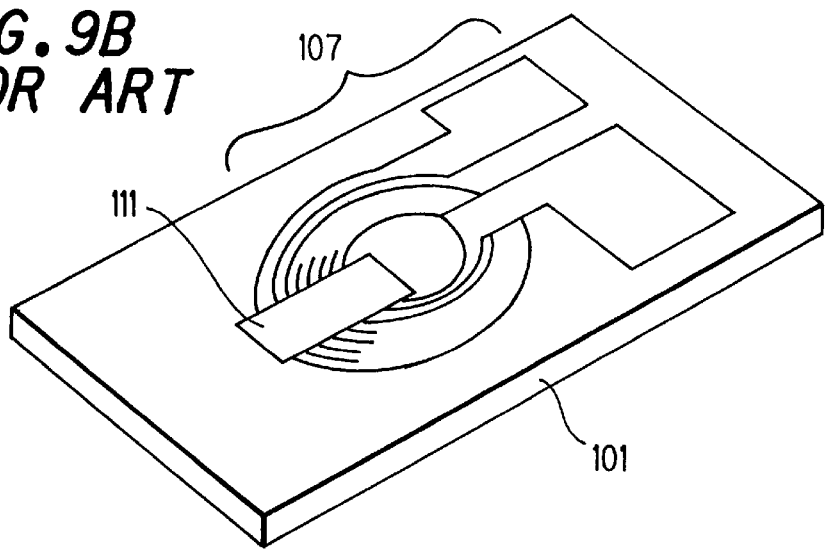
FIG. 9B illustrating an enlargement of the head slider 101 of FIG. 8.
Figure 9C:
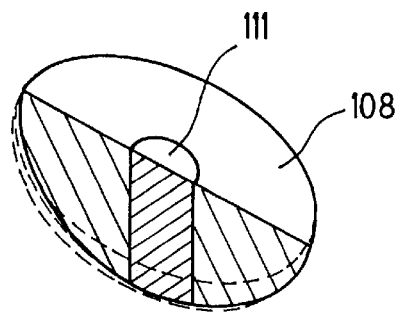
FIG. 9C illustrating an enlargement of a half cut of the contact pad 108 of FIG. 8.
Figure 10:
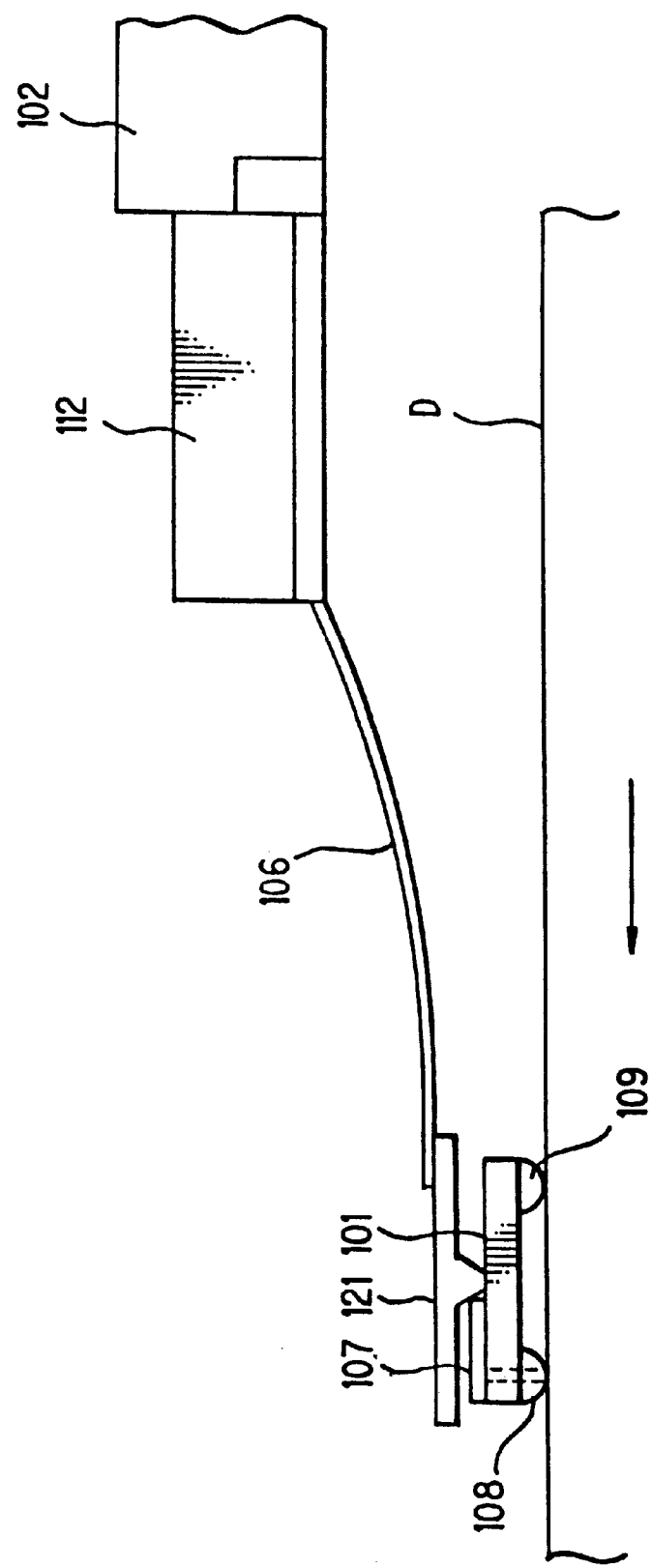
FIG. 10 is a side view illustrating another configuration of the conventional contact-type magnetic disk device.

It is still preferable to provide a reservoir 45 for retaining the lubricant 42 in the facing plate 41a of each of the close-set members 41, as illustrated in FIGS. 6 and 7.

The reservoir 45 is a container of the lubricant 42 configured into a truncated cone in a center part of the facing plate 41a so as to open towards the side surface 1a of the magnetic head slider 1.

By providing the reservoirs 45, scattering or drains of the lubricant 42 can be prevented, and the size of contacting area of the lubricant 42 to the side surface 1a can be easily and exactly defined.

Heretofore, the present invention is described in connection with the magnetic disk device 50 having the configuration as illustrated in FIG. 2 and its modifications. However, it is easily understood that the scope of the invention may not be limited in these embodiments.

For example, the gimbal 30 can be replaced with any other appropriate gimbal mechanism, provided that at least one close-set member, such as the close-set members 41, can be configured being fixed to a base frame of the gimbal mechanism and facing to a side surface of the magnetic head slider 1 for retaining the lubricant injected between the side surface and the close-set member. In the same way, the elevator 53 may be replaced with any other elevation mechanism, provided that it can keep the magnetic head slider 1 separate from the disk surface when the magnetic disk D is not rotating.

What is claimed is:

1. A supporting mechanism of a magnetic head slider performing recording and reproducing magnetic information of a magnetic disk in continuous sliding contact with a recording surface of the magnetic disk; the supporting mechanism comprising:

a beam suspension rotating in a direction perpendicular to recording tracks of the magnetic disk for positioning the magnetic head slider provided at an outer end of the beam suspension and impressing a load onto the magnetic head slider towards the recording surface;

a gimbal for connecting the magnetic head slider to the beam suspension in a manner enabling the magnetic head slider to swing in a rolling and a pitching direction;

at least one close-set members, each of the close-set members extending from a base frame of the gimbal to face one of side surfaces of the magnetic head slider; and lubricant retained between each of the close-set members and corresponding one of the side surfaces.

2. A supporting mechanism of a magnetic head slider as recited in claim 1; wherein each of the close-set members comprises:

a member arm extending from the base frame of the gimbal towards the magnetic head slider; and a facing plate extending from a top of the member arm to be positioned adjacent in parallel to corresponding one of the side surfaces.

3. A supporting mechanism of a magnetic head slider as recited in claim 1; wherein said at least one close-set members are two close-set members each facing either one of two side surfaces of the magnetic head slider perpendicular to a rotating direction of the beam suspension.

4. A supporting mechanism of a magnetic head slider as recited in claim 1; wherein at least one of the close-set members is facing one of the side surfaces of the magnetic head slider perpendicular to a rotating direction of the magnetic disk.

5. A supporting mechanism of a magnetic head slider as recited in claim 1; wherein a reservoir for retaining the lubricant is provided at a part of each of the close-set members being most close to corresponding one of the side surfaces.

6. A supporting mechanism of a magnetic head slider as recited in claim 1; wherein the close-set members are made in one unit with the gimbal from a single member.

7. A supporting mechanism of a magnetic head slider as recited in claim 1; wherein the same material used for lubrication between the magnetic head slider and the magnetic disk is applied to the lubricant retained between the close-set members and the side surfaces of the magnetic head slider.

8. A supporting mechanism of a magnetic head slider as recited in claim 1; wherein grease-like material is applied to the lubricant retained between the close-set members and the side surfaces of the magnetic head slider.

9. A magnetic disk device having a supporting mechanism of a magnetic head slider performing recording and reproducing magnetic information of a magnetic disk in continuous sliding contact with a recording surface of the magnetic disk; the supporting mechanism comprising:

a beam suspension rotating in a direction perpendicular to recording tracks of the magnetic disk for positioning the magnetic head slider provided at an outer end of the beam suspension and impressing a load onto the magnetic head slider towards the recording surface;

a gimbal for connecting the magnetic head slider to the beam suspension in a manner enabling the magnetic head slider to swing in a rolling and a pitching direction;

at least one close-set members, each of the close-set members extending from a base frame of the gimbal to face one of side surfaces of the magnetic head slider; and lubricant retained between each of the close-set members and corresponding one of the side surfaces.

10. A magnetic disk device as recited in claim 9; further comprising an elevator for keeping the magnetic head slider 1 separate from a surface of the magnet disk when the magnetic disk is not rotating.

11. A magnetic disk device as recited in claim 9; wherein each of the close-set members comprises:

a member arm extending from the base frame of the gimbal towards the magnetic head slider; and a facing plate extending from a top of the member arm to be positioned adjacent in parallel to corresponding one of the side surfaces.

12. A magnetic disk device as recited in claim 9; wherein said at least one close-set members are two close-set members each facing either one of two side surfaces of the magnetic head slider perpendicular to a rotating direction of the beam suspension.

13. A magnetic disk device as recited in claim 9; wherein at least one of the close-set members is facing one of the side surfaces of the magnetic head slider perpendicular to a rotating direction of the magnetic disk.

14. A magnetic disk device as recited in claim 9; wherein a reservoir for retaining the lubricant is provided at a part of each of the close-set members being most close to corresponding one of the side surfaces.

15. A magnetic disk device as recited in claim 9: wherein the close-set members are made in one unit with the gimbal from a single member.

16. A magnetic disk device as recited in claim 9; wherein the same material used for lubrication between the magnetic head slider and the magnetic disk is applied to the lubricant retained between the close-set members and the side surfaces of the magnetic head slider.

17. A magnetic disk device as recited in claim 9; wherein grease-like material is applied to the lubricant retained between the close-set members and the side surfaces of the magnetic head slider.

* * * * *

UNITED STATES PATENT AND TRADEMARK OFFICE
CERTIFICATE OF CORRECTION

PATENT NO. : 6,163,438
DATED : December 19, 2000
INVENTOR(S) : Hiroshi Kajitani

It is certified that error appears in the above-identified patent and that said Letters Patent is hereby corrected as shown below:

Item [56] References Cited:

FOREIGN PATENT DOCUMENTS 4-134683   5/1992   (JP)
2-292784   4/1990   (JP)
6-223522   8/1994   (JP)

Signed and Sealed this

Sixteenth Day of October, 2001

Attest:

NICHOLAS P. GODICI
Attesting Officer
Acting Director of the United States Patent and Trademark Office